US012689991B2

(12) United States Patent
Sridharan et al.

(10) Patent No.: US 12,689,991 B2
(45) Date of Patent: Jul. 21, 2026

(54) TECHNIQUES FOR POWER HEADROOM REPORTING FOR DYNAMIC WAVEFORM SWITCHING

(71) Applicant: QUALCOMM Incorporated, San Diego, CA (US)

(72) Inventors: Gokul Sridharan, Sunnyvale, CA (US); Mahmoud Taherzadeh Boroujeni, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 18/498,783

(22) Filed: Oct. 31, 2023

(65) Prior Publication Data

US 2024/0155510 A1 May 9, 2024

Related U.S. Application Data

(60) Provisional application No. 63/382,519, filed on Nov. 6, 2022.

(51) Int. Cl.
*H04W 52/36* (2009.01)
(52) U.S. Cl.
CPC ....... *H04W 52/365* (2013.01); *H04W 52/367* (2013.01)
(58) Field of Classification Search
CPC .......................... H04W 52/365; H04W 52/367
See application file for complete search history.

(56) References Cited

U.S. PATENT DOCUMENTS

| | | | | |
|---|---|---|---|---|
| 10,681,648 B2 * | 6/2020 | Jeon | ..................... | H04W 52/146 |
| 11,882,529 B1 * | 1/2024 | Tiirola | ................ | H04W 52/367 |
| 12,376,100 B2 * | 7/2025 | Taherzadeh Boroujeni | ................ | |
| | | | | H04B 7/0695 |
| 2020/0145987 A1 * | 5/2020 | Ji | ......................... | H04W 72/044 |
| 2020/0196252 A1 * | 6/2020 | Osawa | ................ | H04W 52/365 |
| 2020/0351931 A1 * | 11/2020 | Babaei | ................ | H04W 52/365 |
| 2021/0153134 A1 * | 5/2021 | Osawa | ................ | H04W 52/143 |
| 2022/0400470 A1 * | 12/2022 | Kusashima | ........... | H04W 72/23 |
| 2023/0155655 A1 * | 5/2023 | Zhang | .................. | H04B 7/0691 |
| | | | | 375/262 |

FOREIGN PATENT DOCUMENTS

| | | |
|---|---|---|
| EP | 3531591 A1 | 8/2019 |
| WO | 2018177549 A1 | 10/2018 |
| WO | 2022021208 A1 | 2/2022 |

OTHER PUBLICATIONS

International Search Report and Written Opinion—PCT/US2023/078360—ISA/EPO—Feb. 27, 2024.

* cited by examiner

*Primary Examiner* — Fayyaz Alam
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a network node, a power headroom report, the power headroom report including a field indicating information associated with a first waveform and a second waveform, the second waveform and the first waveform having a common set of transmission parameters. The UE may communicate with the network node in accordance with the power headroom report. Numerous other aspects are described.

30 Claims, 9 Drawing Sheets

Transmit, to a network node, a power headroom report, the power headroom report including a field indicating information associated with a first waveform and a second waveform

610

Receive an indication associated with switching waveform

620

Communicate with the network node in accordance with the power headroom report

630

600

710 Receive, from a UE, a power headroom report, the power headroom report including a field indicating information associated with a first waveform and a second waveform 720 Receive an indication associated with switching waveform 730 Communicate with the UE in accordance with the power headroom report

700

TECHNIQUES FOR POWER HEADROOM REPORTING FOR DYNAMIC WAVEFORM SWITCHING

CROSS-REFERENCE TO RELATED APPLICATION

This patent application claims priority to U.S. Provisional Patent Application No. 63/382,519, filed on Nov. 6, 2022, entitled "TECHNIQUES FOR POWER HEADROOM REPORTING FOR DYNAMIC WAVEFORM SWITCHING," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for power headroom reporting for dynamic waveform switching.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to a method of wireless communication performed by a user equipment (UE). The method may include transmitting, to a network node, a power headroom report, the power headroom report including a field indicating information associated with a first waveform and a second waveform, the second waveform and the first waveform having a common set of transmission parameters. The method may include communicating with the network node in accordance with the power headroom report.

Some aspects described herein relate to a method of wireless communication performed by a network node. The method may include receiving, from a UE, a power headroom report, the power headroom report including a field indicating information associated with a first waveform and a second waveform, the second waveform and the first waveform having a common set of transmission parameters. The method may include communicating with the UE in accordance with the power headroom report.

Some aspects described herein relate to a UE for wireless communication. The user equipment may include a memory and one or more processors coupled to the memory. The one or more processors may be configured to transmit, to a network node, a power headroom report, the power headroom report including a field indicating information associated with a first waveform and a second waveform, the second waveform and the first waveform having a common set of transmission parameters. The one or more processors may be configured to communicate with the network node in accordance with the power headroom report.

Some aspects described herein relate to a network node for wireless communication. The network node may include a memory and one or more processors coupled to the memory. The one or more processors may be configured to receive, from a UE, a power headroom report, the power headroom report including a field indicating information associated with a first waveform and a second waveform, the second waveform and the first waveform having a common set of transmission parameters. The one or more processors may be configured to communicate with the UE in accordance with the power headroom report.

Some aspects described herein relate to a non-transitory computer-readable medium that stores a set of instructions for wireless communication by a UE. The set of instructions, when executed by one or more processors of the UE, may cause the UE to transmit, to a network node, a power headroom report, the power headroom report including a field indicating information associated with a first waveform and a second waveform, the second waveform and the first waveform having a common set of transmission parameters. The set of instructions, when executed by one or more processors of the UE, may cause the UE to communicate with the network node in accordance with the power headroom report.

Some aspects described herein relate to a non-transitory computer-readable medium that stores a set of instructions for wireless communication by a network node. The set of instructions, when executed by one or more processors of the network node, may cause the network node to receive, from a UE, a power headroom report, the power headroom report including a field indicating information associated with a first waveform and a second waveform, the second waveform and the first waveform having a common set of transmission parameters. The set of instructions, when executed by one or more processors of the network node, may cause the network node to communicate with the UE in accordance with the power headroom report.

Some aspects described herein relate to an apparatus for wireless communication. The apparatus may include means for transmitting, to a network node, a power headroom report, the power headroom report including a field indicating information associated with a first waveform and a second waveform, the second waveform and the first waveform having a common set of transmission parameters. The apparatus may include means for communicating with the network node in accordance with the power headroom report.

Some aspects described herein relate to an apparatus for wireless communication. The apparatus may include means for receiving, from a UE, a power headroom report, the power headroom report including a field indicating information associated with a first waveform and a second waveform, the second waveform and the first waveform having a common set of transmission parameters. The apparatus may include means for communicating with the UE in accordance with the power headroom report.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

4

Figure 3:
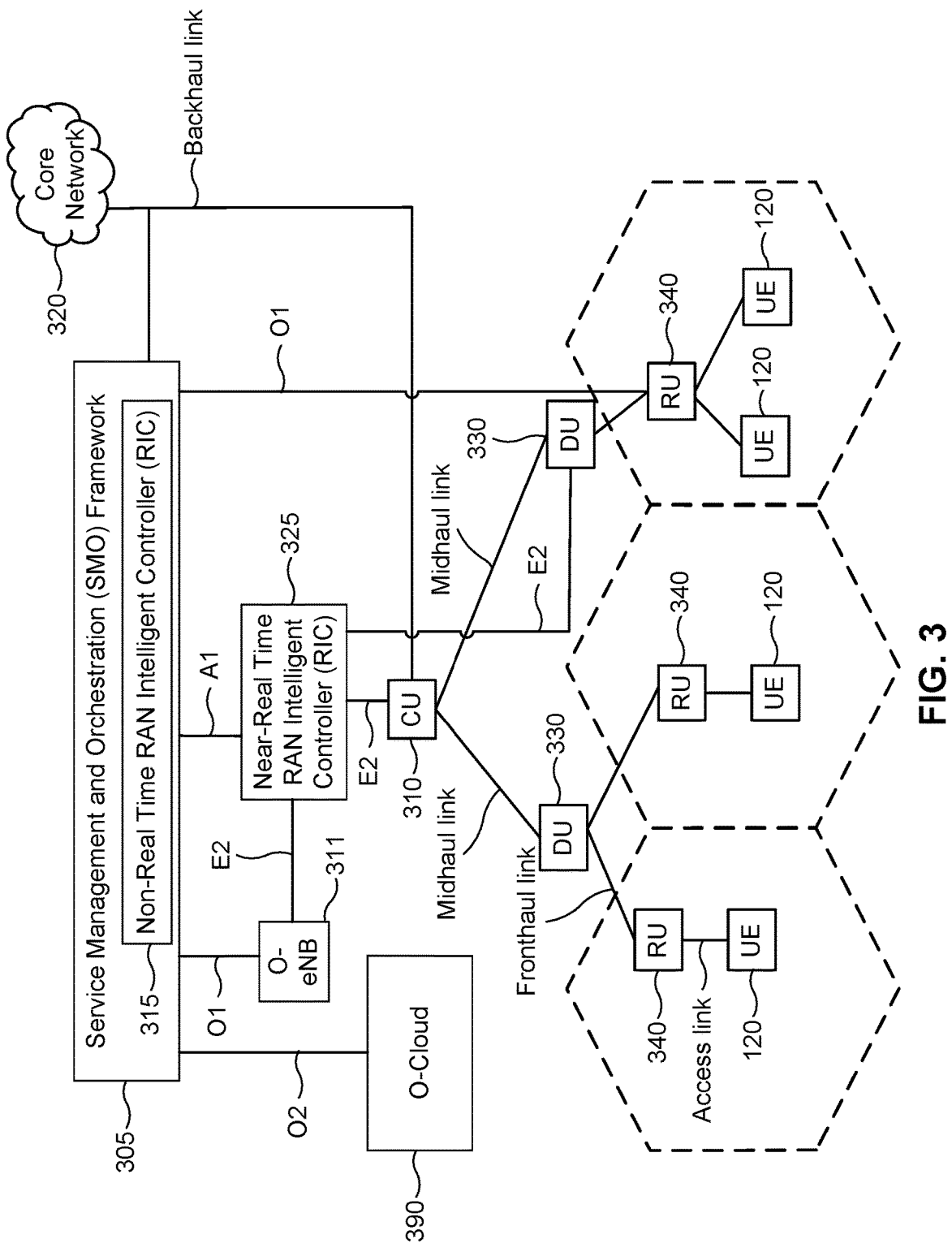

FIG. 3 is a diagram illustrating an example disaggregated base station architecture, in accordance with the present disclosure.

Figure 4:
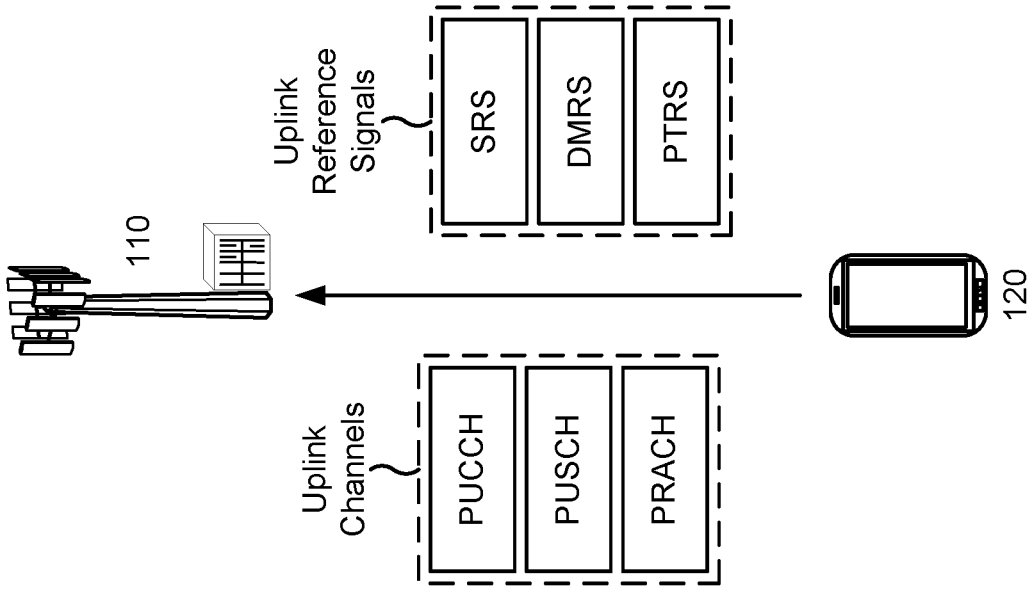
Figure 4:
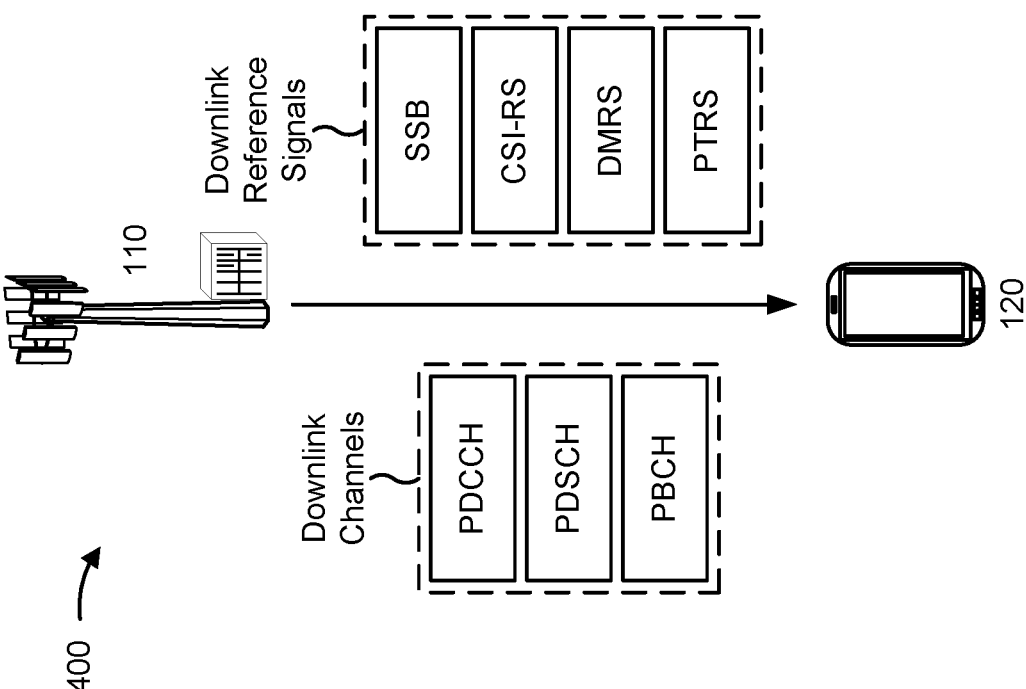

FIG. 4 is a diagram illustrating an example of physical channels and reference signals in a wireless network, in accordance with the present disclosure.

Figure 5:
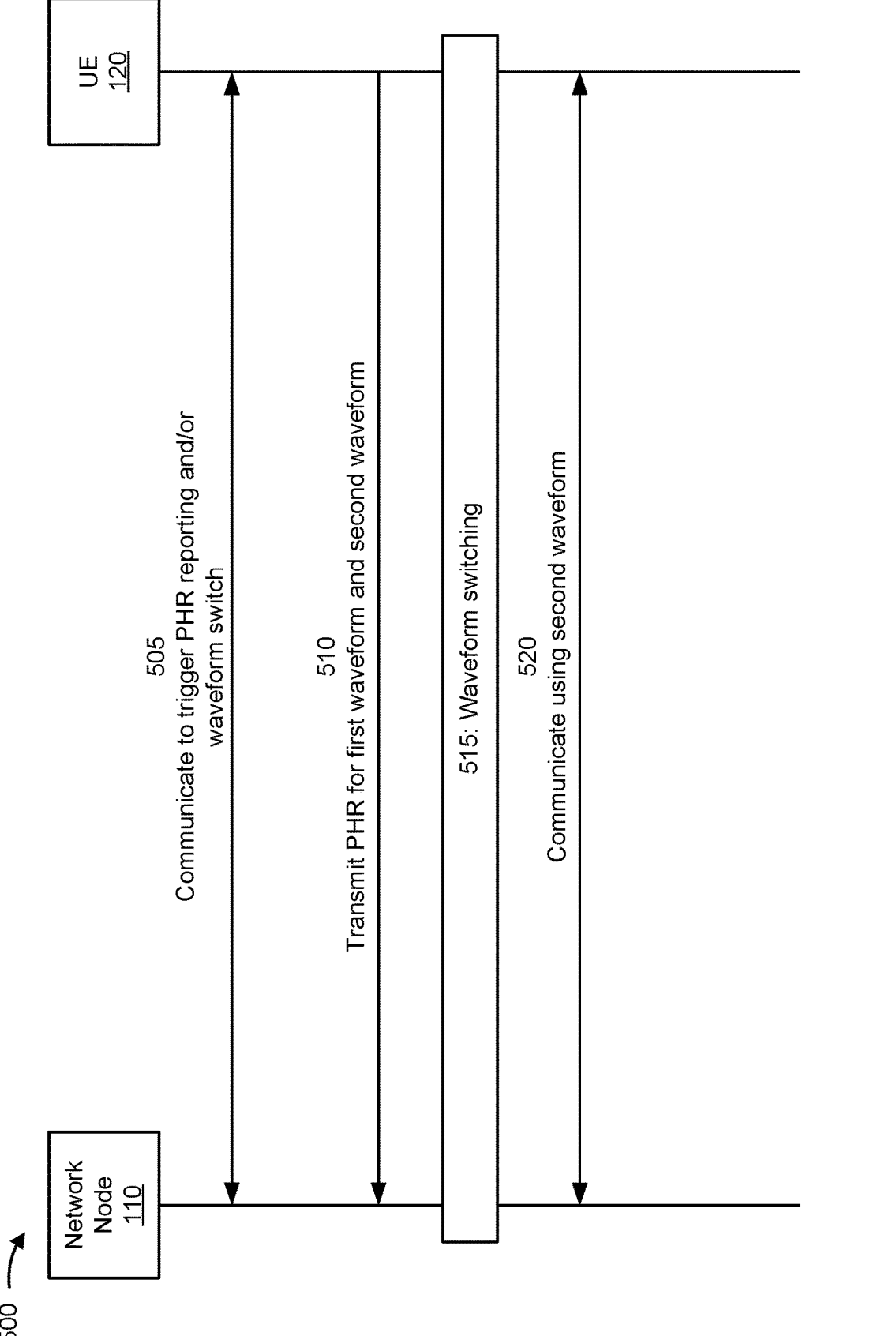

FIG. 5 is a diagram illustrating an example associated with power headroom reporting for dynamic waveform switching, in accordance with the present disclosure.

Figure 6:
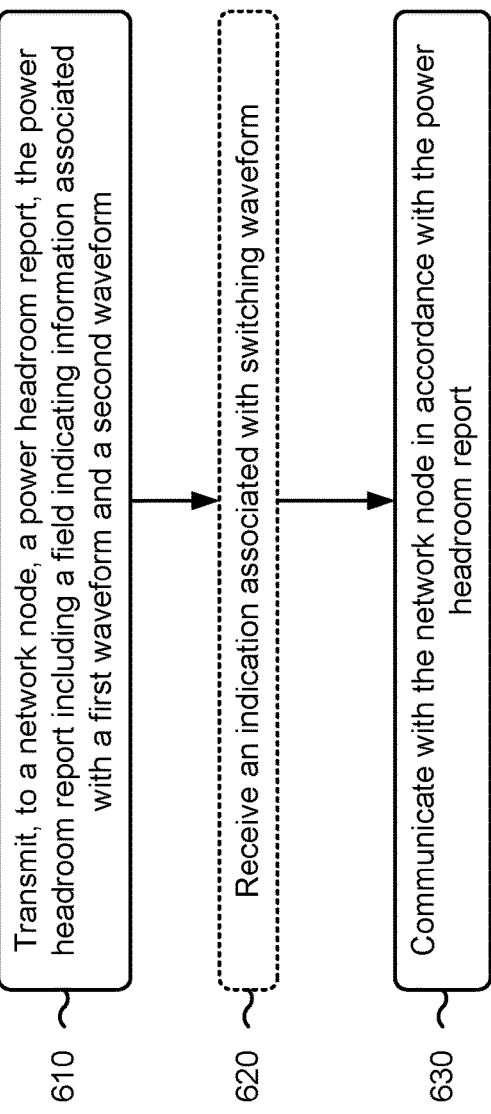

FIG. 6 is a diagram illustrating an example process performed, for example, by a UE, in accordance with the present disclosure.

Figure 7:
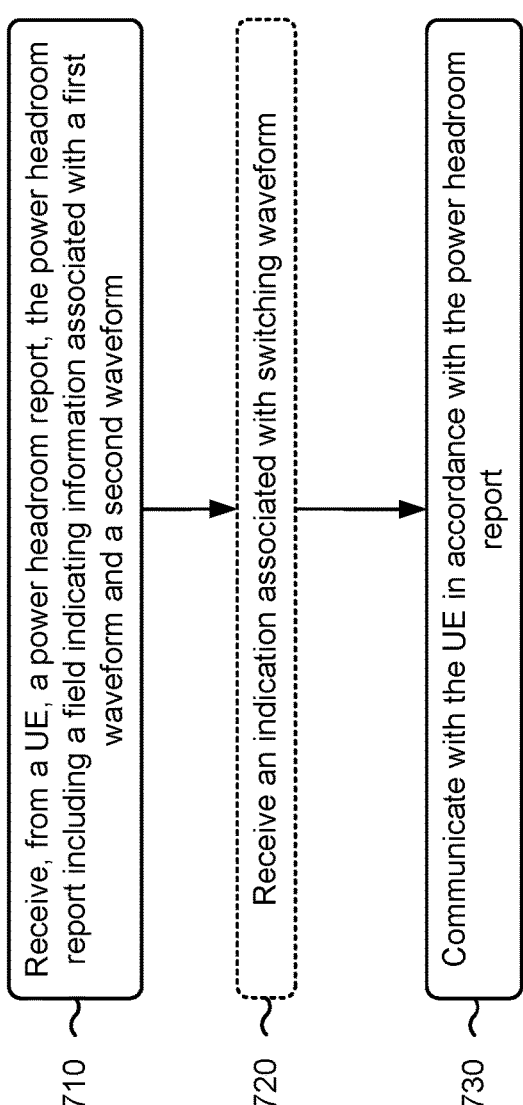

FIG. 7 is a diagram illustrating an example process performed, for example, by a network node, in accordance with the present disclosure.

Figure 8:
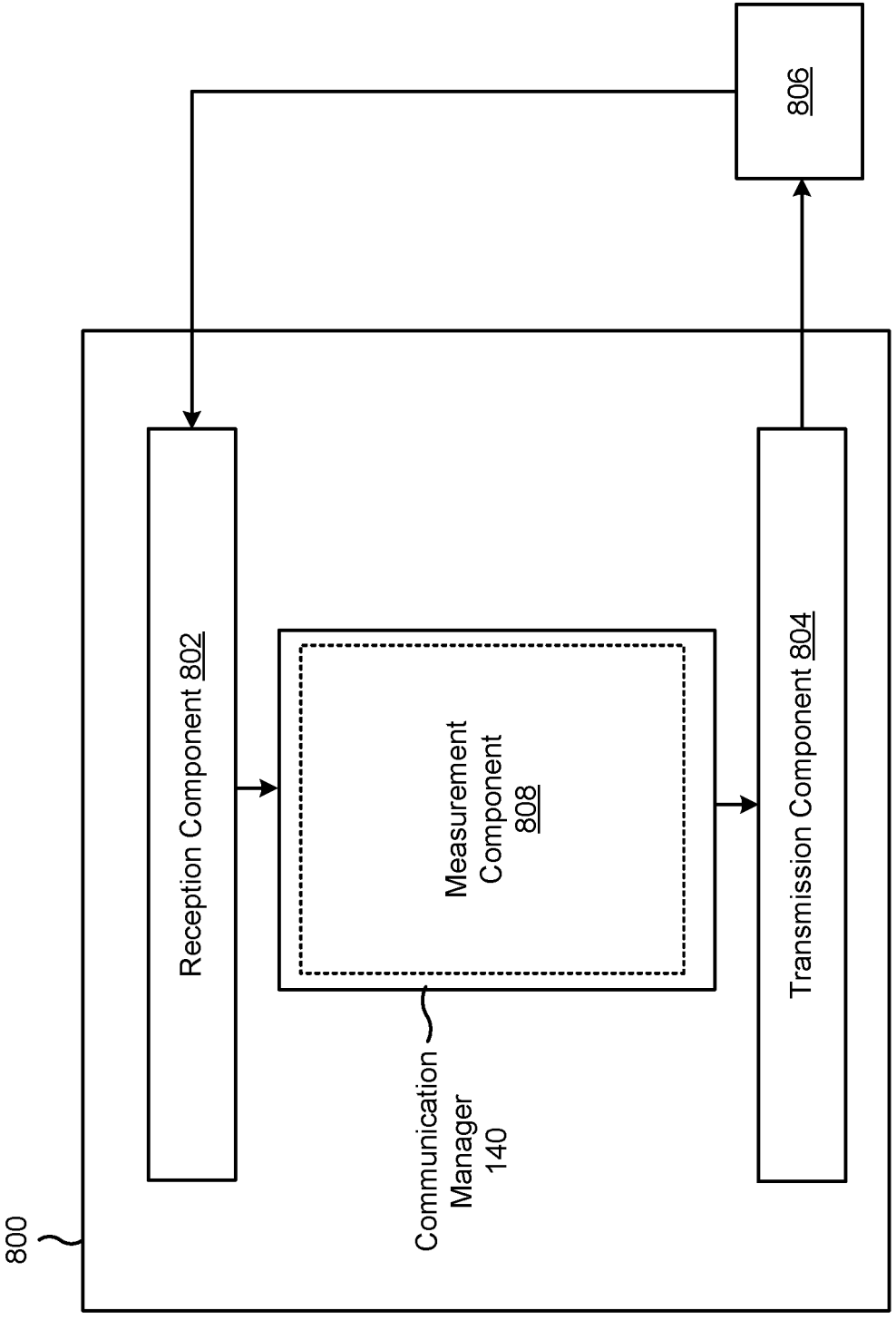

FIG. 8 is a diagram of an example apparatus for wireless communication, in accordance with the present disclosure.

Figure 9:
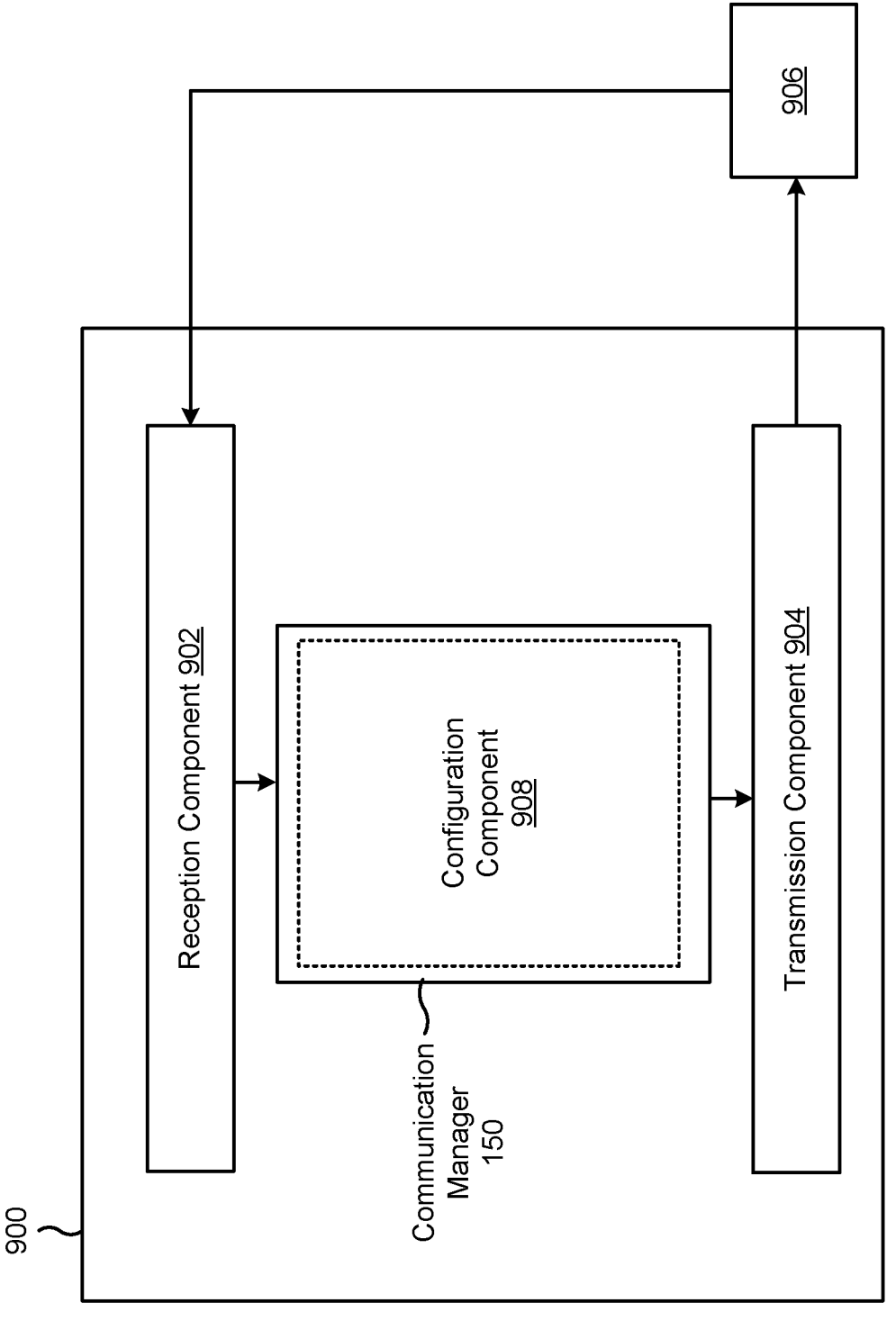

FIG. 9 is a diagram of an example apparatus for wireless communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
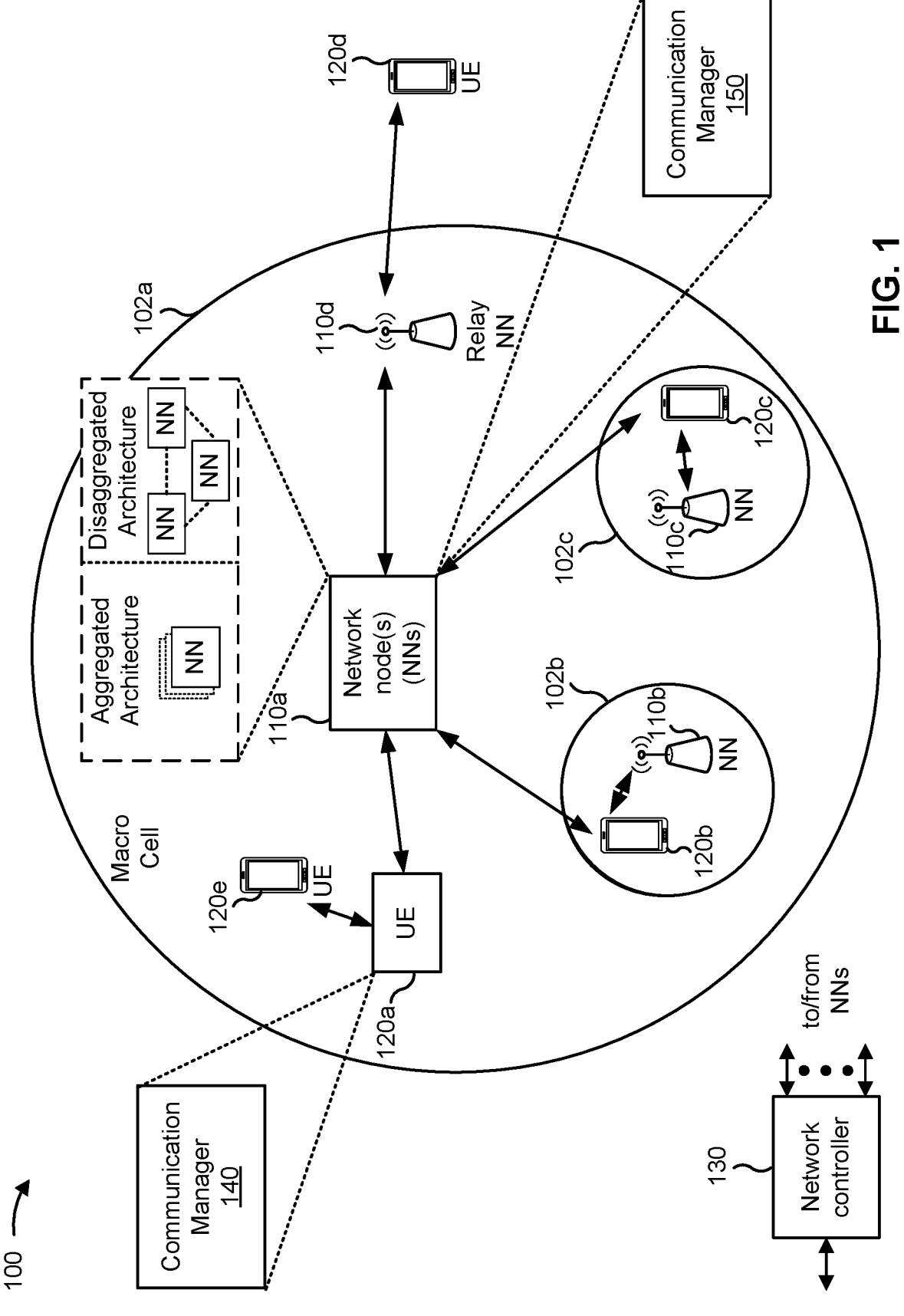
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node 110a, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes

110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and 1-R2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may transmit, to a network node, a power headroom report, the power headroom report including a field indicating information associated with a first waveform and a second waveform, the second waveform and the first waveform having a common set of transmission parameters; and communicate with the network node in accordance with the power headroom report. Additionally, or alternatively, the communication manager 140 may perform one or more other operations described herein.

In some aspects, the network node 110 may include a communication manager 150. As described in more detail elsewhere herein, the communication manager 150 may receive, from a UE, a power headroom report, the power headroom report including a field indicating information associated with a first waveform and a second waveform, the second waveform and the first waveform having a common set of transmission parameters; and communicate with the UE in accordance with the power headroom report. Additionally, or alternatively, the communication manager 150 may perform one or more other operations described herein.

As indicated above, FIG. 1 is provided as an example. Other examples may differ from what is described with regard to FIG. 1.

Figure 2:
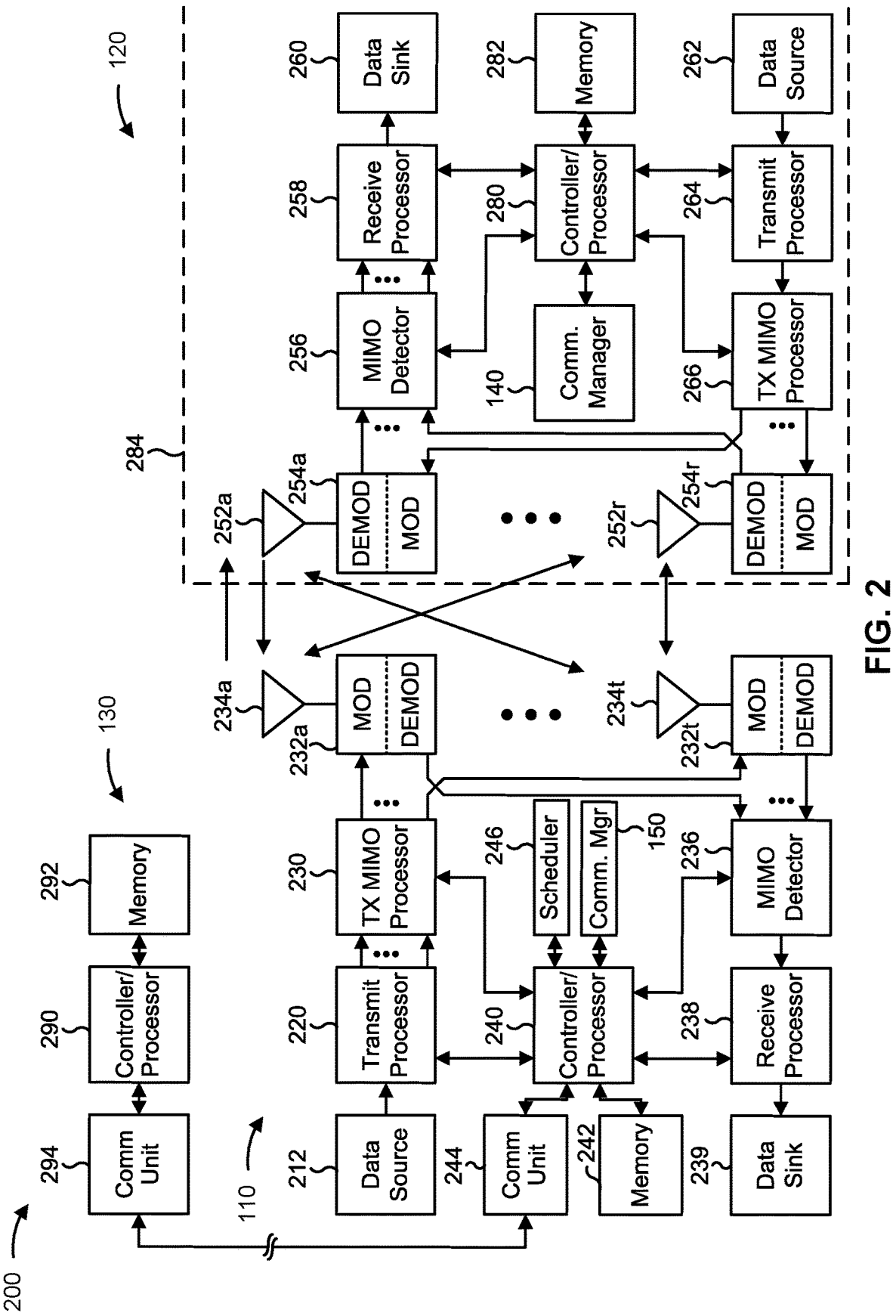
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 5-9).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 5-9).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or sub-components of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with power headroom reporting for dynamic waveform switching, as described in more detail elsewhere herein. For example, the controller/processor 240 of the network node 110, the controller/processor 280 of the UE 120, or any other component(s) (or combinations of components) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for transmitting, to a network node, a power headroom report, the power headroom report including a field indicating information associated with a first waveform and a second waveform, the second waveform and the first waveform having a common set of transmission parameters; and/or means for communicating with the network node in accordance with the power headroom report. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for receiving, from a UE, a power headroom report, the power headroom report including a field indicating information associated with a first waveform and a second waveform, the second waveform and the first waveform having a common set of transmission parameters; and/or means for communicating with the UE in accordance with the power headroom report. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelli-gence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

FIG. 4 is a diagram illustrating an example 400 of physical channels and reference signals in a wireless network, in accordance with the present disclosure. As shown in FIG. 4, downlink channels and downlink reference signals may carry information from a network node 110 to a UE 120, and uplink channels and uplink reference signals may carry information from a UE 120 to a network node 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a PRACH used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the network node 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network node 110 may configure a set of CSI-RS s for the UE 120, and the UE 120 may measure the configured set of CSI-RS s. Based at least in part on the measurements, the UE 120 may perform channel estimation and may report channel estimation parameters to the network node 110 (e.g., in a CSI report), such as a CQI, a precoding matrix indicator (PMI), a CSI-RS resource indicator (CRI), a layer indicator (LI), a rank indicator (RI), or an RSRP, among other examples. The network node 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network node 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network nodes in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the network node 110 may then calculate a position of the UE 120 based on the RSTD measurements reported by the UE 120.

An SRS may carry information used for uplink channel estimation, which may be used for scheduling, link adaptation, precoder selection, or beam management, among other examples. The network node 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network node 110 may measure the SRSs, may perform channel estimation based at least in part on the measurements, and may use the SRS measurements to configure communications with the UE 120.

As indicated above, FIG. 4 is provided as an example. Other examples may differ from what is described with regard to FIG. 4.

In some communications systems, a UE may communicate with a network node using one or more different types of waveforms. For example, the UE may use a DFT-s-OFDM waveform or a CP-OFDM waveform for communication. Each waveform may be associated with different characteristics. For example, a CP-OFDM waveform may support MIMO communications, which may not be supported when using a DFT-S-OFDM waveform. As another example, a DFT-S-OFDM waveform may support a higher transmission power than a CP-OFDM waveform. This may occur because the CP-OFDM waveform may be associated with a larger amount of power backoff at an input to a power amplifier than is used for the DFT-S-OFDM waveform.

A network node may receive a power headroom reporting regarding a waveform. For example, the network node may receive, from a UE, information regarding a set of channel characteristics observed using a particular waveform. The power headroom report may be configured on a per cell group basis with one or more triggers identifying a condition that, when satisfied, is to trigger transmission of the power headroom report, such as a periodicity, a timer, or a power change threshold. The power headroom report may include a set of fields for identifying a power headroom (e.g., a first 6 bits), a maximum power $P_{cmax}$ (e.g., a second 6 bits), a maximum power exposure (MPE) indicator (e.g., a bit indicator of whether MPE is being reported), or an MPE value (e.g., a 2 bit indicator), among other examples. Additional details regarding power headroom reporting and $P_{cmax}$ reporting are described in 3GPP Technical Specification (TS) 38.331 version 17.2.0, in 3GPP TS 38.321 version 17.2.0, 3GPP TS 38.133 version 17.7.0, and 3GPP TS 38.101 version 17.7.0.

In some scenarios, it may be beneficial for the network node and the UE to switch waveforms. For example, switching waveforms (e.g., between DFT-S-OFDM and CP-OFDM) may enable use of multiple layers or an increase in transmit power. This may enable communication at higher throughput rates or with greater reliability in some scenarios. However, to determine whether to switch waveforms, the network node may use information regarding a power headroom using the different waveforms. In other words, when the network node and the UE are communicating using a first waveform, a decision regarding whether to switch to a second waveform may be based at least in part on a power headroom that would occur if the network node and the UE were using the second waveform. However, power headroom reporting includes information regarding the first waveform and not the second waveform.

Some aspects described herein may enable power headroom reporting for wavelength switching. For example, a UE may include, in a power headroom report, information regarding a waveform to which the UE and a network node can switch. Additionally, or alternatively, the UE may include information, in the power headroom report, associated with a first waveform (e.g., that the UE is using) and a second waveform, the second waveform and the first waveform having a common set of transmission parameters (e.g., to which the UE can switch). In this case, the network node may use the power headroom report to determine whether to switch to the second waveform and/or one or more communication parameters for use when using the second waveform. In this way, the UE and the network node improve dynamic wavelength switching, thereby improving throughput or reliability, among other examples.

FIG. 5 is a diagram illustrating an example 500 associated with power headroom reporting for dynamic waveform switching, in accordance with the present disclosure. As shown in FIG. 5, a network node 110 and a UE 120 may communicate with one another.

As further shown in FIG. 5, and by reference number 505, the network node 110 and the UE 120 may communicate to trigger power headroom (PHR) reporting and/or waveform switching.

In some aspects, the network node 110 may trigger a power headroom report. For example, the network node 110 may transmit DCI with a PUSCH grant to request that the UE 120 transmit a power headroom report using the PUSCH grant. In this case, the DCI may include a bit-indicator associated with triggering aperiodic power headroom reporting. Additionally, or alternatively, the DCI may have a set of fields with a format that the UE 120 may interpret as triggering aperiodic power headroom reporting.

Additionally, or alternatively, the UE 120 may trigger the power headroom report based at least in part on satisfaction of a triggering condition. For example, when a UE 120 transmit power is within a threshold amount of a maximum power (e.g., a $P_{powerClass}$ value or a $P_{cmax}$ value), the UE 120 may determine to transmit a power headroom report. Additionally, or alternatively, when the UE 120 receives a PUSCH allocation for single layer transmission with less than a threshold resource block (RB) allocation, the UE 120 may determine to transmit a power headroom report. Additionally, or alternatively, after a waveform switch, the UE 120 may transmit a power headroom report. For example, when a UE 120 transmits a power headroom report and the UE 120 and the network node 110 switch waveforms from a first waveform and a second waveform, the second waveform and the first waveform having a common set of transmission parameters, the UE 120 may transmit a power headroom report for the second waveform (e.g., which may trigger a switch back to the first waveform or to a new third waveform).

In some aspects, the UE 120 may have a triggering condition relating to which waveform the UE 120 and the network node 110 is using. For example, when the UE 120 and the network node 110 use CP-OFDM, the UE 120 may trigger a power headroom report when a transmit power is within a first threshold amount of a maximum. In contrast, when the UE 120 and the network node 110 use DFT-S-OFDM, the UE 120 may trigger a power headroom report when the transmit power is more than a second threshold from the maximum. Similarly, one or more parameters of the power headroom report, such as a phr-Tx-PowerFactor-Change, may be based at least in part on which waveform is being used. In some aspects, the triggering condition is a combination of a plurality of factors, such as a power factor change and a headroom. In some aspects, the triggering condition is a change relative to a previous measurement, such as if a power headroom has changed by a threshold amount relative to a previously reported power headroom. In some aspects, the triggering condition may be applicable to a different format of power headroom report. For example, the above-mentioned triggering conditions may be applicable to power headroom reports that are for dynamic waveform switching (e.g., with fields relating to both a first waveform and a second waveform) or for other types of power headroom reports (e.g., an above-mentioned power headroom report that includes only fields relating to a current waveform).

In some aspects, the UE 120 may calculate one or more values for the power headroom report. For example, for a PUSCH transmission occasion i, an active uplink bandwidth part b of a carrier f of a serving cell c, the UE 120 may compute a Type-1 power headroom report based at least in part on an equation:

$$PH_{type1,b,f,c}(i, j, q_d, l) =$$

$$\tilde{P}_{cmax,f,c}(i) - \{P_{O_{PUSCH},b,f,c}(j) + \alpha_{b,f,c}(j) \cdot PL_{b,f,c}(q_d) + f_{b,f,c}(i, l)\}[\text{dB}]$$

where PH represents the power headroom in decibels (dB), $P_{CMAX,b,f,c}$ is a maximum configured power, $P_{O_{PUSCH,b,f,c}}$ is an open loop power control transmit power, $\alpha_{b,f,c}$ is a factional pathloss compensation parameter, $PL_{b,f,c}$ is a pathloss value, and $f_{b,f,c}$ is an accumulative transmit power control (TPC) command parameter. In this case, the UE 120 may determine $P_{CMAX,b,f,c}$ based at least in part on a power management maximum power reduction (P-MPR) value and/or a backoff value for a current waveform. For a new waveform, the UE 120 may assume an MPR value corresponding to a type of the new waveform. The UE 120 may determine $P_{O_{PUSCH,b,f,c}}$ based at least in part on a nominal PUSCH power $P_{O\_NOMINAL\_PUSCH}$ and a UE actual PUSCH power $P_{O\_UE\_PUSCH}$ for both the power headroom for the current waveform and for the new waveform. Similarly, the UE 120 may use the same $\alpha_{b,f,c}$ parameter, $PL_{b,f,c}$ parameter, and $f_{b,f,c}$ for determining the power headroom value for the current waveform and for the new waveform.

As further shown in FIG. 5, and by reference number 510, the UE 120 may transmit, and the network node 110 may receive, a power headroom report for a first waveform and a second waveform. In some aspects, the UE 120 may trigger waveform switching using the power headroom report. For example, when UE 120 is triggered to transmit a power headroom report, the UE 120 may set a bit indicator in the power headroom report to indicate a request for a waveform switch.

In some aspects, the power headroom report may include one or more sets of fields. For example, the power headroom report may include a set of fields associated with the second waveform to which the UE 120 and the network node 110 are to switch. Additionally, or alternatively, the power headroom report may include information relating to the first waveform. For example, the power headroom report may include a first set of fields associated with identifying a characteristic associated with the first waveform and a second set of fields associated with identifying a characteristic associated with the second waveform. In some aspects, the set of fields relating to the second waveform may have a particular structure. For example, the UE 120 may include a field for reporting a power headroom or a $P_{cmax}$ value in the power headroom report. In this case, the field may be a 6-bit field, as described above, for conveying a power headroom value or an indicator from which the network node 110 can derive a power headroom value.

In some aspects, the power headroom report may have a particular type of mapping between sets of fields and waveforms. For example, the UE 120 and the network node 110 may map a first set of fields in the power headroom report to a current waveform and a second set of fields in the power headroom report to a different waveform to which the UE 120 and the network node 110 are to switch. In this case, the first waveform may map to the first set of fields and the second waveform may map to the second set of fields regardless of respective types of the first and second waveforms. Alternatively, the UE 120 and the network node 110 may have a fixed mapping of waveform types to sets of fields. In this case, the UE 120 may map a first waveform type to the first set of fields and a second waveform type to the second set of fields (e.g., regardless of whether the first waveform type or the second waveform type is a current waveform or a new waveform to which to switch).

In some aspects, the UE 120 may determine whether to use a power headroom report format that enables inclusion of information relating to the second waveform (e.g., the waveform to which the UE 120 and the network node 110 are to switch). For example, the UE 120 may determine to use a first power headroom format (e.g., for which reporting of only the current waveform is configured) when dynamic waveform switching (DWS) is disabled and to use a second power headroom format (e.g., for which reporting of the current waveform and a new waveform is configured) when DWS is enabled.

In some aspects, the UE 120 may determine one or more values to include in a set of fields relating to the second waveform to which the UE 120 and the network node 110 are to switch. For example, the UE 120 may use a common set of transmission parameters for calculating values for a first set of fields (e.g., relating to a first, current waveform) and for a second set of fields (e.g., relating to a second, new waveform). Alternatively, the UE 120 may use different transmission parameters for calculating values for the first set of fields and the second set of fields. In some aspects, when a set of transmission parameters for the first waveform are not compatible with the second waveform, the UE 120 may skip reporting for the second waveform or may report a null value or null codepoint for the second waveform. Additionally, or alternatively, the UE 120 may repot a default value based at least in part on a lack of compatibility of transmission parameters.

In some aspects, the UE 120 may report the power headroom on a different carrier than is used for the first waveform and will be used for the second waveform. For example, when reference PUSCH transmission is enabled, the UE 120 may report, on a first carrier, a power headroom report relating to waveforms on a second carrier (e.g., using a virtual PUSCH transmission). In this case, the UE 120 may use a format for the power headroom report associated with reporting for both a current waveform and a new waveform based at least in part on DWS being enabled on the second carrier. If DWS is enabled on the second carrier, the UE 120 may use a first set of fields for reporting a current waveform in the second carrier. Alternatively, if DWS is not enabled for the second carrier, the first set of fields in the power headroom report may map to a first waveform type and the second set of fields in the power headroom report may map to a second waveform type. In other words, whether mapping is based at least in part on waveform type or which waveform is in current use may be based on whether DWS is enabled for the second carrier.

In some aspects, the UE 120 may set values of fields of the power headroom report and the network node 110 may interpret the fields of the power headroom report based at least in part on a set of conditions. For example, when DWS is enabled and a set of scheduling parameters are configured, the UE 120 and network node 110 may perform a conditional reinterpretation of the fields of the power headroom report. In this case, the set of scheduling parameters may include whether single layer transmission is configured, whether a frequency domain resource allocation (FDRA) (e.g., a quantity of RBs) is compatible with DFT-S-OFDM communication (e.g., the quantity of RBs that are allocated is of the form $2^x 3^y 5^z$), whether CP-OFDM is being used for transmission, or whether a quantity of RBs is less than a threshold value, among other examples. When one or more of the set of scheduling parameters are satisfied, the UE 120 and the network node 110 may reinterpret a 6-bit field of the power headroom report by splitting the 6-bit field into 2 subfields of K bits and M bits respectively (K+M=6). In this case, the first K bit field may convey a power headroom for a current waveform and the second M bit field may convey a differential power headroom value. In other words, the second M bit field may indicate delta value $\Delta$PH for a new waveform power headroom relative to the current waveform power headroom according to an equation:

$$\Delta PH = PH_{dftsofdm} - PH_{cpofdm},$$

where $\Delta$PH is the offset value indicated in the second M bit field, $PH_{dftsofdm}$ is a power headroom for a DFT-S-OFDM waveform, $PH_{cpofdm}$ is a power headroom for a CP-OFDM waveform, and the K bits include an indicator of one of $PH_{dftsofdm}$ or $PH_{cpofdm}$.

In some aspects, the UE 120 may use the same format for power headroom reports relating to a single waveform (e.g., in non-DWS scenarios) and power headroom reports relating to a current waveform and a new waveform (e.g., in DWS scenarios). In this case, the network node 110 may infer that the power headroom report 6-bit field includes a differential power headroom value (e.g., to report power headrooms for the current and new waveforms in a single field), as described above. For example, when the UE 120 reports, in a UE capability report, additional power that can be used for DFT-S-OFDM relative to CP-OFDM, the network node 110 may infer that the UE 120 is using a differential power headroom value in the 6-bit field of the power headroom report. Additionally, or alternatively, the network node 110 may determine how to interpret the 6-bit field based at least in part on an RB allocation and/or a location of an RB allocation in a band. Based at least in part on the power headroom report the network node 110 may determine the additional power for the UE 120 for DFT-S-OFDM relative to CP-OFDM.

As further shown in FIG. 5, and by reference number 515, the UE 120 and the network node 110 may switch to using the second waveform. For example, the UE 120 and the network node 110 may communicate to optionally switch to using the second waveform based at least in part on information included in the power headroom report. In this case, when DWS is enabled and the UE 120 transmits a power headroom report with information relating to the second waveform, the network node 110 may determine to switch waveforms and may communicate with the UE 120 (e.g., transmit an indication to the UE 12) to indicate the waveform switch. In this way, the network node 110 and the UE 120 can improve reliability or throughput by switching waveforms. In some aspects, based at least in part on the power headroom report, the network node 110 may determine not to switch waveforms.

As further shown in FIG. 5, and by reference number 520, the UE 120 and the network node 110 may communicate in accordance with the power headroom report. For example, the UE 120 and the network node 110 may transmit and receive using the second waveform and with a transmit power determined based at least in part on the power headroom report. In this case, the second waveform and transmit power may be in accordance with or based at least in part on the power headroom report by using a value from the power headroom report to identify a corresponding transmit power as a result of an equation or from an entry in a look-up table, among other examples. Additionally, or alternatively, when the network node 110 and the UE 120 determine not to switch waveforms (e.g., based at least in part on the power headroom report), the network node 110 and the UE 120 may communicate using the first waveform.

As indicated above, FIG. 5 is provided as an example. Other examples may differ from what is described with respect to FIG. 5.

FIG. 6 is a diagram illustrating an example process 600 performed, for example, by a UE, in accordance with the present disclosure. Example process 600 is an example where the UE (e.g., UE 120) performs operations associated with power headroom reporting for dynamic waveform switching.

As shown in FIG. 6, in some aspects, process 600 may include transmitting, to a network node, a power headroom report, the power headroom report including a field indicating information associated with a first waveform and a second waveform (block 610). For example, the UE (e.g., using communication manager 140 and/or transmission component 804, depicted in FIG. 8) may transmit, to a network node, a power headroom report, the power headroom report including a field indicating information associated with a first waveform and a second waveform, the second waveform and the first waveform having a common set of transmission parameters, as described above.

As shown in FIG. 6, in some aspects, process 600 may include receiving an indication associated with switching waveform (block 620). For example, the UE (e.g., using communication manager 140 and/or reception component 802, depicted in FIG. 8) may receive an indication associated with switching waveform, as described above.

As further shown in FIG. 6, in some aspects, process 600 may include communicating with the network node in accordance with the power headroom report (block 630). For example, the UE (e.g., using communication manager 140, reception component 802, and/or transmission component 804, depicted in FIG. 8) may communicate with the network node in accordance with the power headroom report, as described above. In some aspects, the UE may communicate with the network node using the second waveform. In some aspects, the UE may communicate with the network node using the first waveform.

Process 600 may include additional aspects, such as any single aspect or any combination of aspects described below and/or in connection with one or more other processes described elsewhere herein.

In a first aspect, process 600 includes receiving configuration information associated with at least one of enabling dynamic waveform switching, configuring the power headroom report, or triggering transmission of the power headroom report.

In a second aspect, alone or in combination with the first aspect, the field includes a value associated with identifying a power headroom for the second waveform or a maximum transmit power for the second waveform.

In a third aspect, alone or in combination with one or more of the first and second aspects, the power headroom report includes a first set of fields associated with the first waveform and a second set of fields associated with the second waveform, the second set of fields including the field.

In a fourth aspect, alone or in combination with one or more of the first through third aspects, the power headroom report includes a first set of fields mapping to a first waveform type and a second set of fields mapping to a second waveform type, the second set of fields including the field.

In a fifth aspect, alone or in combination with one or more of the first through fourth aspects, the UE is configured to include the field in the power headroom report based at least in part on a dynamic waveform switching configuration.

In a sixth aspect, alone or in combination with one or more of the first through fifth aspects, the power headroom report includes a first set of fields associated with the first waveform and a second set of fields associated with the second waveform, the second set of fields including the field, the second set of fields and the first set of fields being based at least in part on the common set of transmission parameters.

In a seventh aspect, alone or in combination with one or more of the first through sixth aspects, the UE is configured to include the field in the power headroom report based at least in part on the common set of transmission parameters being compatible with the second waveform.

In an eighth aspect, alone or in combination with one or more of the first through seventh aspects, the power headroom report is associated with a first carrier and conveyed on the first carrier and another power headroom report for a second carrier is conveyed on the first carrier using a reference physical uplink shared channel to compute a power headroom.

In a ninth aspect, alone or in combination with one or more of the first through eighth aspects, the field is included in the power headroom report based at least in part on a characteristic of the second carrier.

In a tenth aspect, alone or in combination with one or more of the first through ninth aspects, the field conveys a request for switching from the first waveform to the second waveform.

In an eleventh aspect, alone or in combination with one or more of the first through tenth aspects, a configuration of the field and a corresponding interpretation of the field are based at least in part on whether dynamic waveform switching is enabled.

In a twelfth aspect, alone or in combination with one or more of the first through eleventh aspects, a configuration of the field and a corresponding interpretation of the field are based at least in part on whether a condition is satisfied.

In a thirteenth aspect, alone or in combination with one or more of the first through twelfth aspects, whether the condition is satisfied includes at least one of whether a value of a single layer transmission parameter satisfies a first threshold value, whether a value of a frequency domain resource allocation parameter satisfies a second threshold value, whether cyclic prefix orthogonal frequency division multiplexing is enabled, or whether a quantity of resource blocks satisfies a threshold quantity of resource blocks.

In a fourteenth aspect, alone or in combination with one or more of the first through thirteenth aspects, the configuration of the field includes a division of the field into a first subfield and a second subfield, the first subfield relating to the first waveform and the second subfield relating to the second waveform.

In a fifteenth aspect, alone or in combination with one or more of the first through fourteenth aspects, a configuration of the field is based at least in part on a differential power headroom rule.

In a sixteenth aspect, alone or in combination with one or more of the first through fifteenth aspects, the differential power headroom rule relates to at least one of a reported UE capability, a type of waveform for which a power capacity is reported, a resource block allocation, or a location of a resource block allocation.

In a seventeenth aspect, alone or in combination with one or more of the first through sixteenth aspects, process 600 includes receiving downlink control information with a physical uplink shared channel grant associated with indicating a request for the power headroom report, and transmitting the power headroom report includes transmitting the power headroom report using the physical uplink shared channel grant.

In an eighteenth aspect, alone or in combination with one or more of the first through seventeenth aspects, the downlink control information includes a bit indicator or a field configuration to indicate the request for the power headroom report.

In a nineteenth aspect, alone or in combination with one or more of the first through eighteenth aspects, transmitting the power headroom report includes transmitting the power headroom report based at least in part on a trigger condition, the trigger condition being associated with at least one of a threshold power value, a physical uplink shared channel allocation, a waveform switch, a current waveform in use, a previous waveform in use, or a power parameter.

In a twentieth aspect, alone or in combination with one or more of the first through nineteenth aspects, the second waveform is associated with a type-1 power headroom report.

In a twenty-first aspect, alone or in combination with one or more of the first through twentieth aspects, the type-1 power headroom report is computed using one or more parameters relating to the first waveform or the second waveform.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a network node, in accordance with the present disclosure. Example process 700 is an example where the network node (e.g., network node 110) performs operations associated with power headroom reporting for dynamic waveform switching.

As shown in FIG. 7, in some aspects, process 700 may include receiving, from a UE, a power headroom report, the power headroom report including a field indicating information associated with a first waveform and a second waveform (block 710). For example, the network node (e.g., using communication manager 150 and/or reception component 902, depicted in FIG. 9) may receive, from a UE, a power headroom report, the power headroom report including a field indicating information associated with a first waveform and a second waveform, the second waveform and the first waveform having a common set of transmission parameters, as described above.

As shown in FIG. 7, in some aspects, process 700 may include transmitting an indication associated with switching waveform (block 720). For example, the network node (e.g., using communication manager 150 and/or transmission component 904, depicted in FIG. 9) may receive an indication associated with switching waveform, as described above.

As further shown in FIG. 7, in some aspects, process 700 may include communicating with the UE in accordance with the power headroom report (block 730). For example, the network node (e.g., using communication manager 150, reception component 902, and/or transmission component 904, depicted in FIG. 9) may communicate with the UE in accordance with the power headroom report, as described above.

Process 700 may include additional aspects, such as any single aspect or any combination of aspects described below and/or in connection with one or more other processes described elsewhere herein.

In a first aspect, process 700 includes transmitting configuration information associated with at least one of enabling dynamic waveform switching, configuring the power headroom report, or triggering transmission of the power headroom report.

In a second aspect, alone or in combination with the first aspect, the field includes a value associated with identifying a power headroom for the second waveform or a maximum transmit power for the second waveform.

In a third aspect, alone or in combination with one or more of the first and second aspects, the power headroom report includes a first set of fields associated with the first waveform and a second set of fields associated with the second waveform, the second set of fields including the field.

In a fourth aspect, alone or in combination with one or more of the first through third aspects, the power headroom report includes a first set of fields mapping to a first waveform type and a second set of fields mapping to a second waveform type, the second set of fields including the field.

In a fifth aspect, alone or in combination with one or more of the first through fourth aspects, the network node is configured to interpret the field in the power headroom report based at least in part on a dynamic waveform switching configuration.

In a sixth aspect, alone or in combination with one or more of the first through fifth aspects, the power headroom report includes a first set of fields associated with the first waveform and a second set of fields associated with the second waveform, the second set of fields including the field, the second set of fields and the first set of fields being based at least in part on the common set of transmission parameters.

In a seventh aspect, alone or in combination with one or more of the first through sixth aspects, the network node is configured to interpret the field in the power headroom report based at least in part on the common set of transmission parameters being compatible with the second waveform.

In an eighth aspect, alone or in combination with one or more of the first through seventh aspects, the power headroom report is associated with a first carrier and conveyed on the first carrier and another power headroom report for a second carrier is conveyed on the first carrier using a reference physical uplink shared channel to compute a power headroom.

In a ninth aspect, alone or in combination with one or more of the first through eighth aspects, the field is included in the power headroom report based at least in part on a characteristic of the second carrier.

In a tenth aspect, alone or in combination with one or more of the first through ninth aspects, the field conveys a request for switching from the first waveform to the second waveform.

In an eleventh aspect, alone or in combination with one or more of the first through tenth aspects, a configuration of the field and a corresponding interpretation of the field are based at least in part on whether dynamic waveform switching is enabled.

In a twelfth aspect, alone or in combination with one or more of the first through eleventh aspects, a configuration of the field and a corresponding interpretation of the field are based at least in part on whether a condition is satisfied.

In a thirteenth aspect, alone or in combination with one or more of the first through twelfth aspects, whether the condition is satisfied includes at least one of whether a value of a single layer transmission parameter satisfies a first threshold value, whether a value of a frequency domain resource allocation parameter satisfies a second threshold value, whether cyclic prefix orthogonal frequency division multiplexing is enabled, or whether a quantity of resource blocks satisfies a threshold quantity of resource blocks.

In a fourteenth aspect, alone or in combination with one or more of the first through thirteenth aspects, the configuration of the field includes a division of the field into a first subfield and a second subfield, the first subfield relating to the first waveform and the second subfield relating to the second waveform.

In a fifteenth aspect, alone or in combination with one or more of the first through fourteenth aspects, a configuration of the field is based at least in part on a differential power headroom rule.

In a sixteenth aspect, alone or in combination with one or more of the first through fifteenth aspects, the differential power headroom rule relates to at least one of a reported UE capability, a type of waveform for which a power capacity is reported, a resource block allocation, or a location of a resource block allocation.

In a seventeenth aspect, alone or in combination with one or more of the first through sixteenth aspects, process 700 includes transmitting downlink control information with a physical uplink shared channel grant associated with indicating a request for the power headroom report, and receiving the power headroom report includes receiving the power headroom report using the physical uplink shared channel grant.

In an eighteenth aspect, alone or in combination with one or more of the first through seventeenth aspects, the downlink control information includes a bit indicator or a field configuration to indicate the request for the power headroom report.

In a nineteenth aspect, alone or in combination with one or more of the first through eighteenth aspects, receiving the power headroom report includes receiving the power headroom report based at least in part on a trigger condition, the trigger condition being associated with at least one of a threshold power value, a physical uplink shared channel allocation, a waveform switch, a current waveform in use, a previous waveform in use, or a power parameter.

In a twentieth aspect, alone or in combination with one or more of the first through nineteenth aspects, the second waveform is associated with a type-1 power headroom report.

In a twenty-first aspect, alone or in combination with one or more of the first through twentieth aspects, the type-1 power headroom report is computed using one or more parameters relating to the first waveform or the second waveform.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a measurement component 808, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The transmission component 804 may transmit, to a network node, a power headroom report, the power headroom report including a field indicating information associated with a first waveform and a second waveform, the second waveform and the first waveform having a common set of transmission parameters. The reception component 802 and/or the transmission component 804 may communicate with the network node in accordance with the power headroom report. The reception component 802 may receive configuration information associated with at least one of: enabling dynamic waveform switching, configuring the power headroom report, or triggering transmission of the power headroom report. The reception component 802 may receive downlink control information with a physical uplink shared channel grant associated with indicating a request for the power headroom report. The measurement component 808 may measure one or more characteristics of a network or a transmission thereon and generate a power headroom report.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include a configuration component 908, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The reception component 902 may receive, from a UE, a power headroom report, the power headroom report including a field indicating information associated with a first waveform and a second waveform, the second waveform and the first waveform having a common set of transmission parameters. The reception component 902 and/or the transmission component 904 may communicate with the UE in accordance with the power headroom report. The transmission component 904 may transmit configuration information associated with at least one of: enabling dynamic waveform switching, configuring the power headroom report, or triggering transmission of the power headroom report. The transmission component 904 may transmit downlink control information with a physical uplink shared channel grant associated with indicating a request for the power headroom report. The configuration component 908 may configure one or more parameters of a power headroom report or one or more parameters of communication based at least in part on a power headroom report.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: transmitting, to a network node, a power headroom report, the power headroom report including a field indicating information associated with a first waveform and a second waveform, the second waveform and the first waveform having a common set of transmission parameters; and communicating with the network node in accordance with the power headroom report.

Aspect 2: The method of Aspect 1, further comprising: receiving configuration information associated with at least one of: enabling dynamic waveform switching, configuring the power headroom report, or triggering transmission of the power headroom report.

Aspect 3: The method of any of Aspects 1-2, wherein the field includes a value associated with identifying a power headroom for the second waveform or a maximum transmit power for the second waveform.

Aspect 4: The method of any of Aspects 1-3, wherein the power headroom report includes a first set of fields associated with the first waveform and a second set of fields associated with the second waveform, the second set of fields including the field.

Aspect 5: The method of any of Aspects 1-4, wherein the power headroom report includes a first set of fields mapping to a first waveform type and a second set of fields mapping to a second waveform type, the second set of fields including the field.

Aspect 6: The method of any of Aspects 1-5, wherein the UE is configured to include the field in the power headroom report based at least in part on a dynamic waveform switching configuration.

Aspect 7: The method of any of Aspects 1-6, wherein the power headroom report includes a first set of fields associated with the first waveform and a second set of fields associated with the second waveform, the second set of fields including the field, the second set of fields and the first set of fields being based at least in part on the common set of transmission parameters.

Aspect 8: The method of Aspect 7, wherein the UE is configured to include the field in the power headroom report based at least in part on the common set of transmission parameters being compatible with the second waveform.

Aspect 9: The method of any of Aspects 1-8, wherein the power headroom report is associated with a first carrier and conveyed on the first carrier and another power headroom report for a second carrier is conveyed on the first carrier using a reference physical uplink shared channel to compute a power headroom.

Aspect 10: The method of Aspect 9, wherein the field is included in the power headroom report based at least in part on a characteristic of the second carrier.

Aspect 11: The method of any of Aspects 1-10, wherein the field conveys a request for switching from the first waveform to the second waveform.

Aspect 12: The method of any of Aspects 1-11, wherein a configuration of the field and a corresponding interpretation of the field are based at least in part on whether dynamic waveform switching is enabled.

Aspect 13: The method of Aspect 12, wherein a configuration of the field and a corresponding interpretation of the field are based at least in part on whether a condition is satisfied.

Aspect 14: The method of Aspect 13, wherein whether the condition is satisfied includes at least one of: whether a value of a single layer transmission parameter satisfies a first threshold value, whether a value of a frequency domain resource allocation parameter satisfies a second threshold value, whether cyclic prefix orthogonal frequency division multiplexing is enabled, or whether a quantity of resource blocks satisfies a threshold quantity of resource blocks.

Aspect 15: The method of Aspect 13, wherein the configuration of the field includes a division of the field into a first subfield and a second subfield, the first subfield relating to the first waveform and the second subfield relating to the second waveform.

Aspect 16: The method of any of Aspects 1-15, wherein a configuration of the field is based at least in part on a differential power headroom rule.

Aspect 17: The method of Aspect 16, wherein the differential power headroom rule relates to at least one of: a reported UE capability, a type of waveform for which a power capacity is reported, a resource block allocation, or a location of a resource block allocation.

Aspect 18: The method of any of Aspects 1-17, further comprising: receiving downlink control information with a physical uplink shared channel grant associated with indicating a request for the power headroom report; and wherein transmitting the power headroom report includes transmitting the power headroom report using the physical uplink shared channel grant.

Aspect 19: The method of Aspect 18, wherein the downlink control information includes a bit indicator or a field configuration to indicate the request for the power headroom report.

Aspect 20: The method of any of Aspects 1-19, wherein transmitting the power headroom report includes: transmitting the power headroom report based at least in part on a trigger condition, the trigger condition being associated with at least one of: a threshold power value, a physical uplink shared channel allocation, a waveform switch, a current waveform in use, a previous waveform in use, or a power parameter.

Aspect 21: The method of any of Aspects 1-20, wherein the second waveform is associated with a type-1 power headroom report.

Aspect 22: The method of Aspect 21, wherein the type-1 power headroom report is computed using one or more parameters relating to the first waveform or the second waveform.

Aspect 23: A method of wireless communication performed by a network node, comprising: receiving, from a user equipment (UE), a power headroom report, the power headroom report including a field indicating information associated with a first waveform and a second waveform, the second waveform and the first waveform having a common set of transmission parameters; and communicating with the UE in accordance with the power headroom report.

Aspect 24: The method of Aspect 23, further comprising: transmitting configuration information associated with at least one of: enabling dynamic waveform switching, configuring the power headroom report, or triggering transmission of the power headroom report.

Aspect 25: The method of any of Aspects 23-24, wherein the field includes a value associated with identifying a power headroom for the second waveform or a maximum transmit power for the second waveform.

Aspect 26: The method of any of Aspects 23-25, wherein the power headroom report includes a first set of fields associated with the first waveform and a second set of fields associated with the second waveform, the second set of fields including the field.

Aspect 27: The method of any of Aspects 23-26, wherein the power headroom report includes a first set of fields mapping to a first waveform type and a second set of fields mapping to a second waveform type, the second set of fields including the field.

Aspect 28: The method of any of Aspects 23-27, wherein the network node is configured to interpret the field in the power headroom report based at least in part on a dynamic waveform switching configuration.

Aspect 29: The method of any of Aspects 23-28, wherein the power headroom report includes a first set of fields associated with the first waveform and a second set of fields associated with the second waveform, the second set of fields including the field, the second set of fields and the first set of fields being based at least in part on the common set of transmission parameters.

Aspect 30: The method of Aspect 29, wherein the network node is configured to interpret the field in the power headroom report based at least in part on the common set of transmission parameters being compatible with the second waveform.

Aspect 31: The method of any of Aspects 23-30, wherein the power headroom report is associated with a first carrier and conveyed on the first carrier and another power headroom report for a second carrier is conveyed on the first carrier using a reference physical uplink shared channel to compute a power headroom.

Aspect 32: The method of Aspect 31, wherein the field is included in the power headroom report based at least in part on a characteristic of the second carrier.

Aspect 33: The method of any of Aspects 23-32, wherein the field conveys a request for switching from the first waveform to the second waveform.

Aspect 34: The method of any of Aspects 23-33, wherein a configuration of the field and a corresponding interpretation of the field are based at least in part on whether dynamic waveform switching is enabled.

Aspect 35: The method of Aspect 34, wherein a configuration of the field and a corresponding interpretation of the field are based at least in part on whether a condition is satisfied.

Aspect 36: The method of Aspect 35, wherein whether the condition is satisfied includes at least one of: whether a value of a single layer transmission parameter satisfies a first threshold value, whether a value of a frequency domain resource allocation parameter satisfies a second threshold value, whether cyclic prefix orthogonal frequency division multiplexing is enabled, or whether a quantity of resource blocks satisfies a threshold quantity of resource blocks.

Aspect 37: The method of Aspect 35, wherein the configuration of the field includes a division of the field into a first subfield and a second subfield, the first subfield relating to the first waveform and the second subfield relating to the second waveform.

Aspect 38: The method of any of Aspects 23-37, wherein a configuration of the field is based at least in part on a differential power headroom rule.

Aspect 39: The method of Aspect 38, wherein the differential power headroom rule relates to at least one of: a reported UE capability, a type of waveform for which a power capacity is reported, a resource block allocation, or a location of a resource block allocation.

Aspect 40: The method of any of Aspects 23-39, further comprising: transmitting downlink control information with a physical uplink shared channel grant associated with indicating a request for the power headroom report; and wherein receiving the power headroom report includes: receiving the power headroom report using the physical uplink shared channel grant.

Aspect 41: The method of Aspect 40, wherein the downlink control information includes a bit indicator or a field configuration to indicate the request for the power headroom report.

Aspect 42: The method of any of Aspects 23-41, wherein receiving the power headroom report includes: receiving the power headroom report based at least in part on a trigger condition, the trigger condition being associated with at least one of: a threshold power value, a physical uplink shared channel allocation, a waveform switch, a current waveform in use, a previous waveform in use, or a power parameter.

Aspect 43: The method of any of Aspects 23-42, wherein the second waveform is associated with a type-1 power headroom report.

Aspect 44: The method of Aspect 43, wherein the type-1 power headroom report is computed using one or more parameters relating to the first waveform or the second waveform.

Aspect 45: An apparatus for wireless communication at a device, comprising a processor; memory coupled with the processor; and instructions stored in the memory and executable by the processor to cause the apparatus to perform the method of one or more of Aspects 1-22.

Aspect 46: A device for wireless communication, comprising a memory and one or more processors coupled to the memory, the one or more processors configured to perform the method of one or more of Aspects 1-22.

Aspect 47: An apparatus for wireless communication, comprising at least one means for performing the method of one or more of Aspects 1-22.

Aspect 48: A non-transitory computer-readable medium storing code for wireless communication, the code comprising instructions executable by a processor to perform the method of one or more of Aspects 1-22.

Aspect 49: A non-transitory computer-readable medium storing a set of instructions for wireless communication, the set of instructions comprising one or more instructions that, when executed by one or more processors of a device, cause the device to perform the method of one or more of Aspects 1-22.

Aspect 50: An apparatus for wireless communication at a device, comprising a processor; memory coupled with the processor; and instructions stored in the memory and executable by the processor to cause the apparatus to perform the method of one or more of Aspects 23-44.

Aspect 51: A device for wireless communication, comprising a memory and one or more processors coupled to the memory, the one or more processors configured to perform the method of one or more of Aspects 23-44.

Aspect 52: An apparatus for wireless communication, comprising at least one means for performing the method of one or more of Aspects 23-44.

Aspect 53: A non-transitory computer-readable medium storing code for wireless communication, the code comprising instructions executable by a processor to perform the method of one or more of Aspects 23-44.

Aspect 49: A non-transitory computer-readable medium storing a set of instructions for wireless communication, the set of instructions comprising one or more instructions that, when executed by one or more processors of a device, cause the device to perform the method of one or more of Aspects 23-44.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. An apparatus for wireless communication, comprising: one or more memories; and
one or more processors, coupled to the one or more memories, the one or more processors individually or collectively configured to:
receive, from a network node, configuration information enabling dynamic waveform switching and configuring a power headroom report, the power headroom report including a field indicating information associated with a first waveform and a second waveform, the second waveform and the first waveform having a common set of transmission parameters, wherein the power headroom report includes a first set of fields associated with the first waveform and a second set of fields associated with the second waveform, the second set of fields including the field, the second set of fields and the first set of fields being based at least in part on the common set of transmission parameters, and the second waveform being associated with a type-1 power headroom report;
transmit, to the network node, the power headroom report based at least in part on the configuration information enabling dynamic waveform switching; and
communicate with the network node in accordance with the power headroom report.

2. The apparatus of claim 1, wherein the one or more processors, when configured to communicate with the network node, are configured to:
communicate with the network node using the second waveform.

3. The apparatus of claim 1, wherein the one or more processors are further configured to:
receive configuration information associated with triggering transmission of the power headroom report.

4. The apparatus of claim 1, wherein the field includes a value associated with identifying a power headroom for the second waveform or a maximum transmit power for the second waveform.

5. The apparatus of claim 1, wherein the power headroom report includes a first set of fields mapping to a first waveform type and a second set of fields mapping to a second waveform type, the second set of fields including the field.

6. The apparatus of claim 1, wherein the apparatus is configured to include the field in the power headroom report based at least in part on a dynamic waveform switching configuration.

7. The apparatus of claim 1, wherein the apparatus is configured to include the field in the power headroom report based at least in part on the common set of transmission parameters being compatible with the second waveform.

8. The apparatus of claim 1, wherein the power headroom report is associated with a first carrier and conveyed on the first carrier and another power headroom report for a second carrier is conveyed on the first carrier using a reference physical uplink shared channel to compute a power headroom.

9. The apparatus of claim 8, wherein the field is included in the power headroom report based at least in part on a characteristic of the second carrier.

10. The apparatus of claim 1, wherein the field conveys a request for switching from the first waveform to the second waveform.

11. The apparatus of claim 1, wherein a configuration of the field and a corresponding interpretation of the field are based at least in part on whether dynamic waveform switching is enabled.

12. The apparatus of claim 11, wherein a configuration of the field and a corresponding interpretation of the field are based at least in part on whether a condition is satisfied.

13. The apparatus of claim 12, wherein whether the condition is satisfied includes at least one of:
whether a value of a single layer transmission parameter satisfies a first threshold value,
whether a value of a frequency domain resource allocation parameter satisfies a second threshold value,
whether cyclic prefix orthogonal frequency division multiplexing is enabled, or
whether a quantity of resource blocks satisfies a threshold quantity of resource blocks.

14. The apparatus of claim 12, wherein the configuration of the field includes a division of the field into a first subfield and a second subfield, the first subfield relating to the first waveform and the second subfield relating to the second waveform.

15. The apparatus of claim 1, wherein a configuration of the field is based at least in part on a differential power headroom rule.

16. The apparatus of claim 15, wherein the differential power headroom rule relates to at least one of:
a reported UE capability,
a type of waveform for which a power capacity is reported,
a resource block allocation, or
a location of a resource block allocation.

17. The apparatus of claim 1, wherein the one or more processors are further configured to:
receive downlink control information with a physical uplink shared channel grant associated with indicating a request for the power headroom report; and

wherein the one or more processors, to transmit the power headroom report, are configured to transmit the power headroom report using the physical uplink shared channel grant.

18. The apparatus of claim 17, wherein the downlink control information includes a bit indicator or a field configuration to indicate the request for the power headroom report.

19. The apparatus of claim 1, wherein the one or more processors, to transmit the power headroom report, are configured to:

transmit the power headroom report based at least in part on a trigger condition, the trigger condition being associated with at least one of:

a threshold power value, a physical uplink shared channel allocation, a waveform switch, a current waveform in use, a previous waveform in use, or a power parameter.

20. The apparatus of claim 1, wherein the type-1 power headroom report is computed using one or more parameters relating to the first waveform or the second waveform.

21. An apparatus for wireless communication, comprising:

one or more memories; and one or more processors, coupled to the one or more memories, the one or more processors individually or collectively configured to:

transmit, to a user equipment (UE), configuration information enabling dynamic waveform switching and configuring a power headroom report, the power headroom report including a field indicating information associated with a first waveform and a second waveform, the second waveform and the first waveform having a common set of transmission parameters, wherein the power headroom report includes a first set of fields associated with the first waveform and a second set of fields associated with the second waveform, the second set of fields including the field, the second set of fields and the first set of fields being based at least in part on the common set of transmission parameters, and the second waveform being associated with a type-1 power headroom report;

receive, from the UE, the power headroom report based at least in part on the configuration information enabling dynamic waveform switching; and communicate with the UE in accordance with the power headroom report.

22. The apparatus of claim 21, wherein the one or more processors, when configured to communicate with the UE, are configured to:

communicate with the UE using the second waveform.

23. The apparatus of claim 21, wherein the one or more processors are further configured to:

transmit configuration information associated with triggering transmission of the power headroom report.

24. The apparatus of claim 21, wherein the field includes a value associated with identifying a power headroom for the second waveform or a maximum transmit power for the second waveform.

25. A method of wireless communication performed by a user equipment (UE), comprising: transmitting, to a network node, a power headroom report, the power headroom report including a field indicating information associated with a first waveform and a second waveform, the second waveform and the first waveform having a common set of transmission parameters, wherein the power headroom report includes a first set of fields associated with the first waveform and a second set of fields associated with the second waveform, the second set of fields including the field, the second set of fields and the first set of fields being based at least in part on the common set of transmission parameters, and the second waveform being associated with a type-1 power headroom report; receiving, from the UE, the power headroom report based at least in part on the configuration information enabling dynamic waveform switching; and communicating with the network node in accordance with the power headroom report.

26. A method of wireless communication performed by a network node, comprising: receiving, from a user equipment (UE), a power headroom report, the power headroom report including a field indicating information associated with a first waveform and a second waveform, the second waveform and the first waveform having a common set of transmission parameters, wherein the power headroom report includes a first set of fields associated with the first waveform and a second set of fields associated with the second waveform, the second set of fields including the field, the second set of fields and the first set of fields being based at least in part on the common set of transmission parameters, and the second waveform being associated with a type-1 power headroom report; transmitting, to the network node, the power headroom report based at least in part on the configuration information enabling dynamic waveform switching; and communicating with the UE in accordance with the power headroom report.

27. The method of claim 25, further comprising: communicating with the network node using the second waveform.

28. The method of claim 25, further comprising: receiving configuration information associated with triggering transmission of the power headroom report.

29. The method of claim 25, wherein the field includes a value associated with identifying a power headroom for the second waveform or a maximum transmit power for the second waveform.

30. The method of claim 25, wherein the power headroom report includes a first set of fields mapping to a first waveform type and a second set of fields mapping to a second waveform type, the second set of fields including the field.

* * * * *